United States Patent [19]

Meyer-Güldner et al.

[11] Patent Number: 6,014,476
[45] Date of Patent: Jan. 11, 2000

[54] ELECTRO-OPTICAL MODULE

[75] Inventors: Frank Meyer-Güldner; Jörg-Reinhardt Kropp; Mathias Grumm; Georg Jeiter, all of Berlin, Germany

[73] Assignee: Siemens Aktiengesellschaft, Munich, Germany

[21] Appl. No.: 09/198,692

[22] Filed: Nov. 24, 1998

Related U.S. Application Data

[63] Continuation of application No. PCT/DE97/01041, May 16, 1997.

[51] Int. Cl.[7] ............................................. G02B 6/12
[52] U.S. Cl. ............................................................. 385/14
[58] Field of Search ................................. 385/14, 88–92, 385/147

[56] References Cited

U.S. PATENT DOCUMENTS

| | | | |
|---|---|---|---|
| 4,552,422 | 11/1985 | Bennett et al. | 339/17 CF |
| 4,979,787 | 12/1990 | Lichtenberger | 385/88 |
| 5,014,161 | 5/1991 | Lee et al. | 361/388 |
| 5,259,053 | 11/1993 | Schaffer et al. | |

FOREIGN PATENT DOCUMENTS

| | | | |
|---|---|---|---|
| 0053482A2 | 6/1982 | European Pat. Off. | |
| 0413489A2 | 2/1991 | European Pat. Off. | |
| 0600645 | 6/1994 | European Pat. Off. | 385/88 |
| 0600645A1 | 6/1994 | European Pat. Off. | |

*Primary Examiner*—Akm E. Ullah
*Attorney, Agent, or Firm*—Herbert L. Lerner; Laurence A. Greenberg

[57] ABSTRACT

The electro-optical module has a substrate with a mounting surface that is free from depressions. A surface-mounted component unit is disosed on the mounting surface. The component unit contains as integral components an electro-optical component and a lens which are aligned directly with one another. The surface serves, furthermore, as a reference plane for assembling a receptacle for an optical fiber plug.

6 Claims, 2 Drawing Sheets

ELECTRO-OPTICAL MODULE

CROSS-REFERENCE TO RELATED APPLICATION

This is a continuation of copending International Application PCT/DE97/01041, filed May 16, 1997, which designated the United States.

BACKGROUND OF THE INVENTION

FIELD OF THE INVENTION

The invention is in the field of electro-optical structures for optical systems. In particular, the invention pertains to an electro-optical module having an electro-optical component and having a receptacle for an optical fiber plug, which are arranged on a single surface of a substrate, and having a lens arranged in the optical path between the component and the receptacle.

Such modules are utilized in the transmission of signals by means of optical fibers, and contain at least one component which comprises an electro-optical transducer. An electro-optical transducer serves to convert optical signals into electrical signals and/or, conversely, to convert electrical signals into optical signals.

A module of the above-mentioned type has become known from U.S. Pat. No. 5,337,398 (European EP 0 600 645 A1) to Benzoni et al. That module comprises two electro-optical components (laser diode and photodiode) which are positioned on metal surfaces (pads) precisely placed on a silicon substrate by means of a reheatable solder. When the solder is subsequently reheated (i.e., reflow), the components are centered with respect to the pads because of the surface tension of the liquefied solder.

A multiplicity of alignment depressions are produced in the silicon material by etching into the surroundings of the pads, and thus in the surroundings of the electro-optical components. It is possible to insert into the depressions aligning elements—for example, aligning balls—which cooperate with corresponding aligning depressions in a separate carrier which is to be aligned precisely via the respective electro-optical component.

The carrier can carry a lens provided in the beam path between the component and a receptacle for an optical fiber plug, or can align the receptacle directly with respect to the components.

If the individual parts are produced with extreme precision, in particular the carrier, the bipartite aligning depressions and, if appropriate, the lens and/or the receptacle for the optical fiber plug, then the prior art module renders it possible to dispense with an active adjustment of the receptacle with respect to the electro-optical component. The height of the carrier and, if applicable, the lens diameter are, however, design variables, which exert a considerable influence on the relative position of the receptacle and/or of the optical fiber plug with respect to the electro-optical component in the Z-direction. The Z-direction is the orientation of the optical fiber or the direction of the beam path. The direct fastening, addressed in U.S. Pat. No. 5,337,398 (EP 0 600 645 A1), of the receptacle on the substrate surface can then lead to component strains when the geometry of the carrier and, if applicable, of the lens does not permit the actual positioning of the receptacle in the Z-direction to be connected directly without strain to the substrate.

SUMMARY OF THE INVENTION

It is accordingly an object of the invention to provide an electro-optical module, which overcomes the above-mentioned disadvantages of the heretofore-known devices and methods of this general type and which has highly precise, reproducible coupling geometries in the Z-direction with as few individual parts as possible.

With the foregoing and other objects in view there is provided, in accordance with the invention, an electro-optical module, comprising:

a substrate formed with a mounting surface;

a receptacle for an optical fiber plug defining a beam path substantially perpendicular to the mounting surface; and an integrated component unit mounted on the mounting surface, the component unit comprising an electro-optical component and a lens directly aligned with one another in the beam path between the electro-optical component and the receptacle. It is advantageous, thereby, that it is no longer necessary to provide the mounting surface with aligning structures.

In other words, the objects of the invention are satisfied with an electro-optical module of the type mentioned in the introduction that has a mounting surface free of aligning structures, and wherein the electro-optical component and the lens are aligned directly with one another, forming an integrated component unit that can be assembled on the surface.

From a production engineering standpoint, a substantial advantage of the invention consists in that—apart from conductor tracks and metallizations—the surface of the substrate can remain unstructured and free from depressions. Consequently, the selection of the material for the substrate is not dependent on special structuring properties—such as, for example, in the case of the silicon substrate to be used in accordance with the above-mentioned U.S. Pat. No. 5,337,398. Rather, the substrate (for example, printed circuit board) can be selected in an optimum fashion in accordance with aspects of handling, production engineering and, in particular, costs.

A further substantial advantage of the invention consists in the fact that the surface-mountable component unit formed by the electro-optical component and the lens can be produced and tested in advance in a highly precise fashion. Subsequent assembly, affected by tolerances, of a lens support via an electro-optical component which is to be assembled in advance on the substrate is not required with the novel module. Consequently, both production engineering is simplified and an additional tolerance variable is excluded. The component unit can preferably have metallic surfaces for direct electrical contact with the substrate. The reproducible accuracy in the Z-direction is determined only by the component unit, while the substrate thickness is quite irrelevant in this regard.

In accordance with an added feature of the invention, the receptacle is disposed so as not to touch the component unit, the receptacle making contact with and being connected substantially only to the mounting surface of the substrate. This feature permits an embodiment that is completely free from strain and is scarcely stressed in the case of temperature variations.

In accordance with an additional feature of the invention, there is provided an electronic circuit on a surface of the substrate that is averted from the receptacle. Consequently, an electronic drive circuit (in the state of transmission) or a receiving or amplifying circuit can be arranged very near to the component. The signal paths are thereby shortened, and the vulnerability of the system is reduced.

In accordance with another feature of the invention, a cap is attached directly to the mounting surface of the substrate for electrically shielding the component unit. This feature is particularly important to further improve the radio-frequency properties and the insensitivity to external disturbances.

In accordance with a concomitant feature of the invention, the substrate forms a part of a rigid-flexible-rigid circuit carrier.

The design engineering is thereby simplified. Mechanical and electrical connections are united by design in the flexible part of the rigid-flexible-rigid circuit carrier.

Other features which are considered as characteristic for the invention are set forth in the appended claims.

Although the invention is illustrated and described herein as embodied in an electro-optical module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
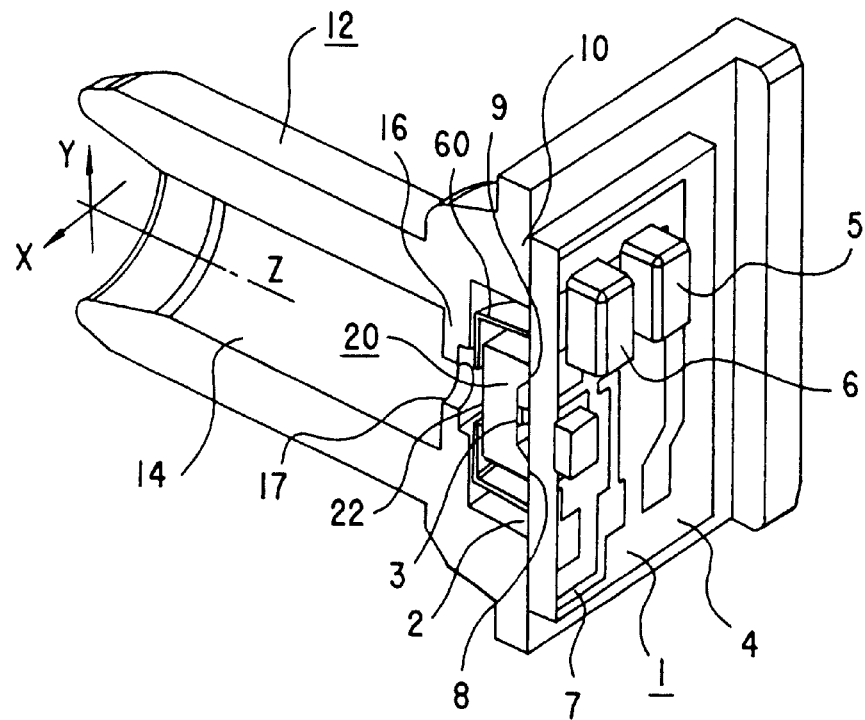
FIG. 1 is a perspective view of a longitudinal section through a module according to the invention.

Referring now to the figures of the drawing in detail and first, particularly, to FIG. 1 thereof, there is seen an electro-optical module with a substrate in the form of a printed circuit board 1. Among other components, the PCB 1 carries on its front flat side (first surface) 2 an electro-optical component 3. Indicated on the rear surface 4 of the substrate 1 are individual electronic components 5, 6 which are interconnected via conductor tracks 7, and are connected to connector pads 8, 9 on the first surface 2 by means of electric bushings (not represented in more detail) through the substrate 1. The connector pads serve to make contact with the electro-optical component 3. A flange 10 of a receptacle 12 is supported on the same surface 2. The flange 10 is formed with a central bore 14 for receiving an optical fiber plug (not illustrated in more detail for reasons of clarity). Upon insertion, the end face of the plug comes to bear against a partition 16 with a central bore 17 which defines an optical path between the electro-optical component 3 and an optical fiber end held centrally in the optical fiber plug. As will become clear from the following, more detailed explanation, the component 3 forms an integral component of a component unit 20 mounted on the surface 2 of the substrate 1.

The top side 22, remote from the substrate, of the component unit 20 is shaped as a lens (compare FIG. 2), which is thus situated in the optical path between the component and the receptacle 12. The surface 2 has the pads 8, 9, and is otherwise not structured mechanically; in particular, it includes no aligning depressions for the component unit 20.

Figure 2A:
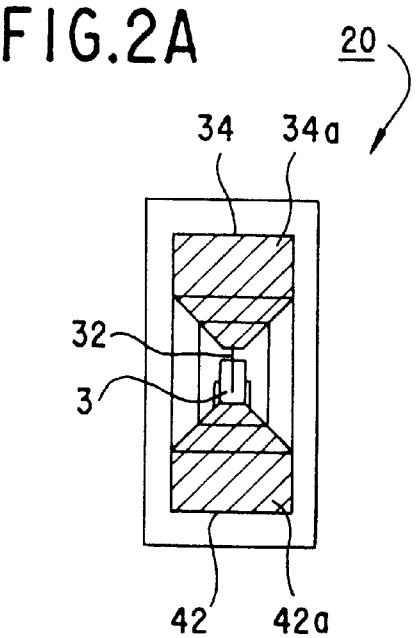
FIG. 2A is an enlarged plan view of the component unit 20 of FIG. 1.
Figure 2B:
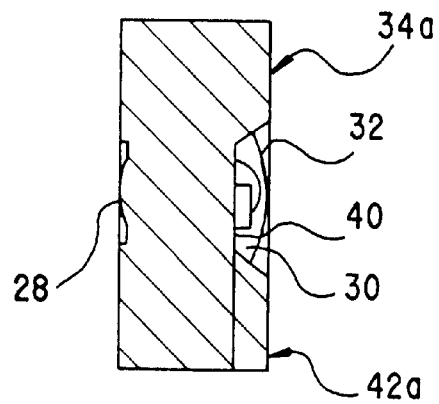
FIG. 2B is a sectional view of the component unit.

As FIG. 2 shows in plan view (FIG. 2A) and in a sectional representation (FIG. 2B), the component unit 20 is an integrated unit of a lens 28, constructed on the top side 22, and an electro-optical component 3. For the purpose of protection against external influences, the component 3 is embedded in a hermetically tight fashion in a filling compound 30 which also includes a bond wire 32 provided for contacting the component 3 on the top side thereof. As illustrated in FIG. 2A, the bond wire 32 leads to a connecting metallization 34 which extends over a bevel and the base region of a depression 40 holding the component 3. The underside of the component 3 is connected in an electrically conducting fashion to a second metallization 42. When the component unit 20 is mounted on the surface 2, the outer metallization regions 34a, 42a make contact with the corresponding connector pads on the substrate. This type of contacting is known as surface mounting.

Referring again to FIG. 1, the receptacle 12 is arranged so as not to touch with respect to the component unit 20, and makes contact with and is connected to only the surface 2 of the substrate 1. It is possible thereby to achieve a design of the module which is particularly low in strain and is insensitive to temperature changes. Also to be seen is an electrically conducting cap 60 which is attached directly to the surface 2 and by means of which the component unit 20 is electrically screened on the receptacle side.

In the described module, although there may be a need to adjust the receptacle 12 with respect to the component 3 in the X-Y direction—that is to say in the plane perpendicular to the Z-direction—this adjustment is not a problem, because of the smooth surface 2, of planar construction, of the printed circuit board. The module offers the substantial advantage that only comparatively few tolerances influence the accuracy in the Z-direction, with the result that in this regard no adjusting or correcting measures remain necessary after assembly. A further advantage of the module is that the component unit 20 and the receptacle 12 are aligned in the Z-direction with the same reference surface—specifically, the surface 2. The accuracy in the Z-direction is thereby essentially determined only by a single part, i.e., the component unit 20. The substrate thickness, on the other hand, has no bearing. The evaluation or drive electronics for the component 3 can advantageously be arranged on the rear side of the substrate. Favorable radio-frequency properties and a high insensitivity to external disturbances are ensured by short conductor tracks 7 and direct plated-through holes to the component unit 20. The insensitivity is further increased by the cap 60, with which contact is correspondingly made.

Figure 3:
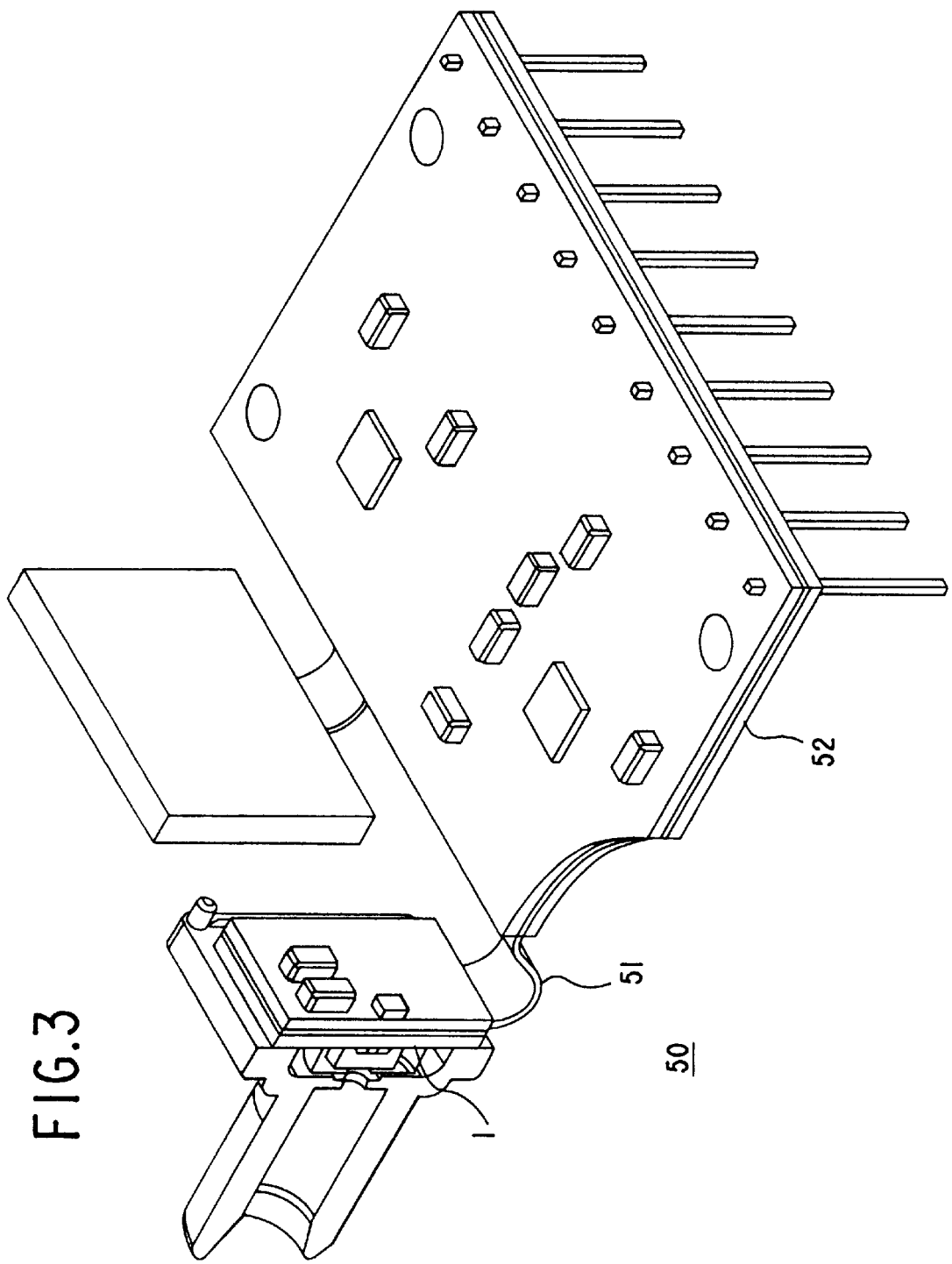
FIG. 3 is a partial perspective view of the substrate as part of a rigid-flexible-rigid circuit carrier.

With reference to FIG. 3, the perspective view shows a rigid-flexible-rigid circuit carrier 50. The combination comprises a rigid part 1, formed by the substrate, a flexible part 51 with flexible conductors and a further rigid part 52. The circuit carrier 50 can be mounted as a unit during assembly. The result is substantially improved economy with regard to production fastening steps.

We claim:

1. An electro-optical module, comprising:
    a substrate formed with a mounting surface;
    a receptacle for an optical fiber plug defining a beam path substantially perpendicular to said mounting surface; and
    an integrated component unit mounted on said mounting surface, said component unit comprising an electro-optical component and a lens directly aligned with one another in the beam path between said electro-optical component and said receptacle.

2. The electro-optical module according to claim 1, wherein said mounting surface is substantially free from aligning structures.

3. The electro-optical module according to claim 1, wherein the receptacle is disposed so as not to touch said component unit, said receptacle making contact with and being connected substantially only to said mounting surface of said substrate.

4. The electro-optical module according to claim 1, wherein said substrate has a second surface on a side thereof averted from said receptacle, and including an electronic circuit carried on said second surface.

5. The electro-optical module according to claim 1, which further comprises a cap attached directly to said mounting surface of said substrate for electrically shielding said component unit.

6. The electro-optical module according to claim 1, wherein said substrate forms a part of a rigid-flexible-rigid circuit carrier.

\* \* \* \* \*